United States Patent
Bobrow et al.

[11] Patent Number: 5,984,062
[45] Date of Patent: *Nov. 16, 1999

[54] METHOD FOR CONTROLLING AN ACTIVE TRUSS ELEMENT FOR VIBRATION SUPPRESSION

[76] Inventors: James E. Bobrow, 8 Zola Crt.; Faryar Jabbari, 21 Zola Crt, both of Irvine, Calif. 92715

[*] Notice: Under 35 U.S.C. 154(b), the term of this patent shall be extended for 301 days.

[21] Appl. No.: 08/761,014

[22] Filed: Dec. 5, 1996

Related U.S. Application Data

[63] Continuation of application No. 08/394,416, Feb. 24, 1995, abandoned.
[51] Int. Cl.⁶ .................................................... F16F 7/10
[52] U.S. Cl. ..................... 188/378; 188/380; 188/299.1
[58] Field of Search ..................... 188/378–380, 188/299.1, 312, 316; 52/167.1–167.5

[56] References Cited

U.S. PATENT DOCUMENTS

| | | |
|---|---|---|
| 3,561,574 | 2/1971 | Dickinson, Jr. et al. . |
| 4,887,699 | 12/1989 | Ivers et al. ............................... 188/378 |
| 4,949,573 | 8/1990 | Wolfe et al. ......................... 188/378 X |
| 4,973,077 | 11/1990 | Kuwayama et al. . |
| 4,981,199 | 1/1991 | Tsai . |
| 5,022,201 | 6/1991 | Kobori et al. . |
| 5,025,599 | 6/1991 | Ishii et al. . |
| 5,036,633 | 8/1991 | Kobori et al. . |
| 5,046,290 | 9/1991 | Ishii . |
| 5,065,552 | 11/1991 | Kobori et al. . |
| 5,147,018 | 9/1992 | Kobori et al. . |
| 5,168,673 | 12/1992 | Nemir . |
| 5,193,323 | 3/1993 | Ishii . |
| 5,311,709 | 5/1994 | Kobori et al. ....................... 52/167 DF |
| 5,337,864 | 8/1994 | Sjoestroem . |
| 5,347,771 | 9/1994 | Kobori et al. . |
| 5,456,341 | 10/1995 | Garnjost et al. ......................... 188/378 |

OTHER PUBLICATIONS

J.N. Yang et al., "Control of Seismic Excited Buildings Using Active Variable Stiffness System," Proc. of 1994 American Control Conf., Baltimore, MD pp. 1083–1088.

G. Leitmann et al., "Semiactive Control of a Vibrating System by if Electrorheological Fluids," Dynamics & Control, vol. 3, #1, Jan. 1993, pp. 7–34.

McClamroch et al., "Electroheological Dampers and Semi-Active Structural Control," Proc. of 1994 CDC, pp. 93–103.

W.N. Patten et al., "Semiactive Control of Civil Engineering Structures," Proc. of 1994 ACC, Baltimore, MD, pp. 1078–1082.

T.T. Soong, Active Structural Control: Theory and Application, Longman Scientific, New York, 1990.

T. Kobori et al, "Dynamic Intelligent Buildings: Active Seismic Response Control," in Intelligent Structures: Monitoring and Control, Elsevier Applied Science, NY at 279–92(1991).

*Primary Examiner*—Peter M. Poon
*Attorney, Agent, or Firm*—Daniel L. Dawes

[57] ABSTRACT

In order to meet the demands of simplicity and reliability in active control systems for flexible structures, an inexpensive active truss element and control law has been developed. A decentralized switching control law is used along with a compressible fluid in the truss element in order to dissipate energy during the motion of the structure. However, the energy is not absorbed in the same manner as a conventional viscous damper. The truss element retains its maximum stiffness, but has a resettable nominal unstressed length. Energy is absorbed in the working fluid of the truss element through heat transfer to the environment when the nominal length is reset at the proper switching times. The control law is insensitive to changes in structural parameters such as mass, stiffness, and damping.

20 Claims, 4 Drawing Sheets

METHOD FOR CONTROLLING AN ACTIVE TRUSS ELEMENT FOR VIBRATION SUPPRESSION

This is a continuation of copending application Ser. No. 08/394,416 filed on Feb. 24, 1995 now abandoned.

BACKGROUND OF THE INVENTION

FIELD OF THE INVENTION

Although many active control laws have been developed for vibration suppression in structural systems, few of these meet the practical requirements of large force capability, robustness, reliability, and simplicity. Recent advances in control have resulted in a great many high performance control design methods. Most, however, require actuators capable of producing large forces, with high degrees of reliability and fidelity to their modeled behavior. While a great deal of research is underway to address such issues systematically, most efforts seem to be aimed at developing more complex hardware and control law designs.

Recently, switching type control laws have been implemented in experimental structures and in operational buildings. See, J. N. Yang, Z. Li, and J. C. Wu, "Control of Seismic Excited Buildings Using Active Vatiable Stiffness System," Proceedings of the 1994 American Control Conferences, Baltimore, Md., pp 1083–1088; G. Leitmann and E. Reithmeirer, "Semiactive Control of a Vibrating System by Means if Electrorzeological Fluids"; Dynamics and Control, vol 3, no 1, January 1993, pp 7–34; N. H. McClamroch, H. P. Gavin, D. S. Ortiz, and R. D. Hanson, "Electrorheological Dampers and Semi-Active Structural Control", Proceedings of 1994 CDC, pp 93–103; and W. N. Patten and R. L. Sack, "Semiactive Control of Civil Engineeting Structures", Proceedings of 1994 ACC, Baltimore, Md., pp 1078–1082. These prior art teachings are among the examples of alternative approaches that have been receiving increasing attention. Sliding mode techniques have been used to design control schemes for a building equipped with bracing that can be locked or unlocked, hence changing the effective stiffness of the building. See Yang, supra. These active variable stiffness (AVS) systems have been installed on full scale buildings and shown to be effective for control of structures under strong seismic excitations. See, T. T. Soong, Active Structural Control: Theory and Application, Longman Scientific, New York, 1990; and T. Kobori, S. Kamagata, "Dynamic Intelligent Buildings: Active Seismic Response Control," in Intelligent Structures: Monitoring and Control, Elsevier Applied Science, N.Y. at 279–82 (1991).

In addition to these techniques, general Lyapunov stability methods have been applied to a class of parametric control problems (i.e., systems in which important parameters of the system are altered to obtain desirable behavior). See, Leitmann, supra. In particular, systems where the effective damping and stiffness can be changed continuously, within a limited range, through the use of electro-rheological fluids.

Another application of the use of novel materials and the associated modeling and design for structural control has recently been developed as described by McClamroch, supra. These methods are often called semi-active due to the simple fact the amount of power and force needed are quite minimal (e.g., enough to control the orifice in a valve or the current through the fluid).

Another example of such devices has been developed by Patten, supra, wherein hydraulics are used to reduce the strain energy of structures.

Seismic hydraulic cylinders used in systems to change and damp the resonant frequencies of buildings are described in Kobori et.al., "High Damping Device for Seismic Response Controlled Structure," U.S. Pat. No. 5,347,771 (1994); Kobori, et. al., "Variable Damping and Stiffness Structure," U.S. Pat. No. 5,036,633 (1991); Ishii et. al, "Compound Seismic Response and Wind Control System," U.S. Pat. No. 5,025,599 (1991); Kobori et. al., "Active Seismic Response Control System for Use in Structure," U.S. Pat. No. 5,065,552 (1991); Kobori et. al., "Variable Damping Device for Seismic Response Controlled Structure," U.S. Pat. No. 5,311,709 (1994); Dickinson Jr. et. al, "Fluid Flow Control Device", U.S. Pat. No. 5,561,574 (1971); Kobori et. al., "Apparatus for Accelerating Response Time of Active Mass Damper Earthquake Attenuator," U.S. Pat. No. 5,022,201 (1991); Kobori et. al., "Cylinder Lock Device for Use in Structure," U.S. Pat. No. 5,147,018 (1992); Isshi et. al., "Safety Monitoring Method for Use in Active Seismic Response and Wind Control System," U.S. Pat. No. 5,193,323 (1993); Isshi et. al., "Safety Monitoring Device for Use in Active Seismic Response and Wind Control System," U.S. Pat. No. 5,046,290 (1991); Sjoestroem, "Suspension System with Improved Response Damping and a Method for Regulating the Suspension System," U.S. Pat. No. 5,337,864 (1994); and Nemir, "Method and Apparatus for Damping Vibrations," U.S. Pat. No. 5,168,673 (1992). Although these devices use hydraulic cylinders with controlled valves, their method of control is generally directed to controlling or damping frequencies of vibration and little direct attention is paid to optimizing or tracking the absorption of energy in the system.

What is needed is an apparatus and method for its control that requires minimal power, e.g. only enough to open and close a valve, and which will act only to reduce the total amount of energy of the system. The system should ideally be decentralized in the sense that the behavior of each actuator is dependent only on the degrees of freedom it is directly attached to. It should be reliable, in that it does not require full state sensing (or an observer), and the associated control law must be simple with minimal hardware complexity. Furthermore, the control law should not require an exact model of the system it damps and, hence, must be robust with respect to parameter uncertainty.

BRIEF SUMMARY OF THE INVENTION

The invention is a method of controlling the zero force position of an axial spring, or truss element for maximizing the absorption of energy in a structure. The method comprises the steps of determining when a predetermined amount of energy is stored in the resettable truss element by movement of the structure, and resetting the truss element to substantially relax the truss element and absorb the predetermined energy therein. As a result, energy vibration in the structure is optimally absorbed in the truss element. The predetermined energy is determined to be the maximum amount of energy stored in the truss element.

In the embodiment where the truss element is a double acting hydraulic cylinder with a first and second chamber, the step of determining when the energy stored in the truss element is maximal comprises the step of measuring the difference in pressure between the first and second chamber within the double acting hydraulic cylinder, and then determining when the pressure differential between the first and second chambers is maximum or minimum. Resetting the truss element comprises equalizing pressure in the first and second chamber. Equalizing the pressure in the first and second chamber is performed within a time period substantially less than most periods of motion of the structure.

The first and second chambers are coupled through a valve-controlled conduit. The valve is closed at all times until a maximum or minimum pressure differential is detected at which time the valve opens equalizing pressure between the first and second chamber and converts energy stored in the truss element into heat. The valve closes after the pressure has been equalized.

The method may be extended to the situation where a plurality of resettable truss elements are provided and coupled to the structure. The step of determining when the predetermined energy stored in the truss elements has reached a predetermined maximum or minimum in each case is separately determined with respect to each of the truss elements. The truss elements are also reset separately from each other. This provides robustness and simplicity of control.

The method further comprises the step of sizing the truss element to provide a predetermined stiffness of an effective spring constant associated with the truss element with respect to the structure. The predetermined stiffness matches structural requirements of the structure. The sizing the truss element is performed for each of the plurality of truss elements. In particular, the plurality of truss elements are coupled to the structure in a plurality of locations and each of the truss elements is sized according to requirements for stiffness at the corresponding location of the truss element.

In particular, resetting the truss element comprises resetting the truss element whenever the first derivative of energy in the truss element is zero, namely $dE/dt=0$, and $E>0$, where E is the energy stored in the truss element and t is time. This method is extended to a plurality of truss elements, each of which are coupled to the structure, and each of which is reset when the change in the first derivative of the energy of each truss element is zero.

The invention is alternatively defined as an apparatus for absorbing energy in a structure comprising a resettable truss element coupled to the structure. A sensor is coupled to the resettable truss element for determining energy stored in the truss element. A control circuit is coupled to the sensor and resettable truss element. The control circuit is responsive to the sensor to reset energy stored in the truss element to zero when a predetermined energy parameter is detected by the control circuit. As a result, energy absorption within the structure is improved.

In the illustrated embodiment the resettable truss element is a double acting hydraulic cylinder having a first and second chamber and the sensor is a pair of pressure transducers, one of which is disposed in the first chamber and the other one of which is disposed in the second chamber of the hydraulic cylinder. The control circuit resets the truss element when energy transferred to the truss element from the structure is maximal. The control circuit resets the truss element when energy transferred to the truss element from the structure is maximal and wherein the maximal energy is detected when the change of the first derivative of the energy is zero, namely $dE/dt=0$ where E is the energy stored in the truss element and t is time.

The control circuit resets the truss element when energy transferred to the truss element from the structure is maximal. The maximal energy is determined when the pair of sensors indicates a maximal pressure difference between the first and second chambers in the hydraulic cylinder.

The invention may be better visualized by turning to the following drawings wherein like elements are referenced by like numerals.

The invention and its various embodiments may now be understood in connection with the following detailed description.

DETAILED DESCRIPTION OF THE PREFERRED EMBODIMENTS

In order to meet the demands of simplicity and reliability in active control systems for flexible structures, an inexpensive active truss element and control law has been developed. A decentralized switching control law is used along with a compressible fluid in the truss element in order to dissipate energy during the motion of the structure. However, the energy is not absorbed in the same manner as a conventional viscous damper. The truss element retains its maximum stiffness, but has a resettable nominal unstressed length. Energy is absorbed in the working fluid of the truss element through heat transfer to the environment when the nominal length is reset at the proper switching times. The control law is insensitive to changes in structural parameters such as mass, stiffness, and damping.

Experimental and numerical results from a three story model building are discussed below by way of example. The detailed design and mathematical characterization of the structural control element will also be discussed. A Lyapunov-like function is used to prove the stability of the system. The decentralized switching control law drives the system state to a switching surface with a prescribed rate of decay. The effects of practical limitations such as actuator location and size requirements are discussed.

Dynamics of the Truss Element

Figure 1:
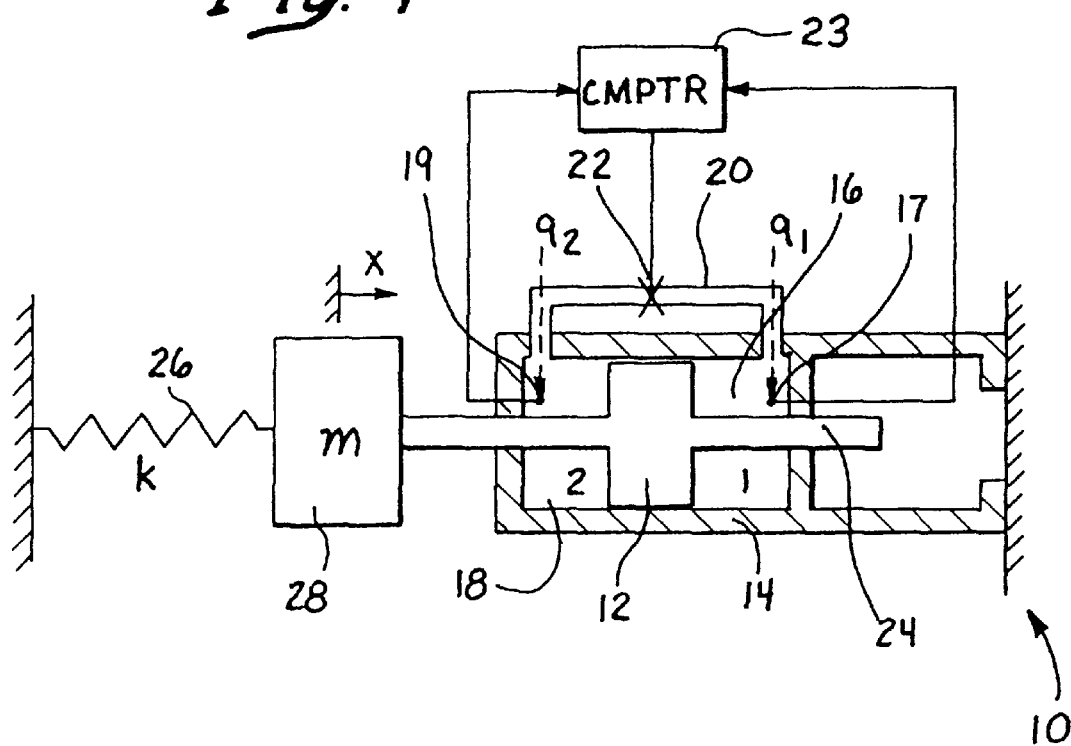
FIG. 1 is a simplified diagrammatic model of a truss element controlled according to the method of the invention.
Figure 6:
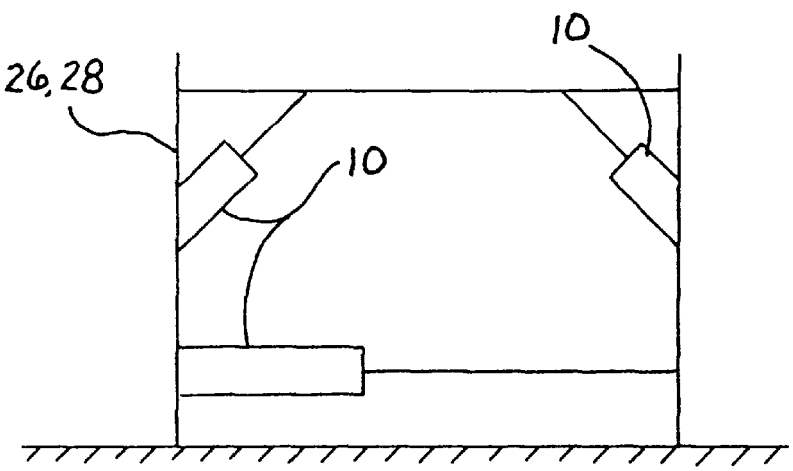
FIG. 6 is a schematic depiction of a plurality of truss elements as shown and described in connection with FIGS. 1–5.

FIG. 1 is a simplified diagram of a one degree of freedom system, generally denoted by reference numeral 10. A double action piston 12 is provided in a cylinder 14 to define two chambers 18 and 16 in cylinder 14 on opposite sides of piston 12. Chambers 18 and 16 are connected through a conduit 20 in which a valve 22 is disposed. A rod 24 extends through cylinder 14 to give equal areas on both sides of piston 12. A pressure transducer 17 is disposed in chamber 16 and a pressure transducer 19 is disposed in chamber 18. Transducers 17 and 19 are electrically coupled to logic circuit or computer 23 which includes memory and controls valve 22 according to the control law described below.

This double acting cylinder 14 and valve 22 could be used to provide variable damping to the system as in some modern automobile suspension systems. However, that is not our intention. Spring 26 and mass 28 symbolically represent and model the structure to which actuator 10 is attached. If spring 26 is not stiff enough to handle static loading conditions and other structural requirements, stiffness could be added to the system by closing the valve in the cylinder and using the fluid therein and cylinder as a structural member or spring. In fact, the effective spring constant can easily be made extremely large so that tons of force could be exerted on the mass, if desired. If the valve is kept closed for most of the time of operation of the system, then hydraulic actuator 10 can be thought of as a truss element in that it is used in exactly the same way as a structural truss element.

The structural dynamics for the system shown in FIG. 1 are;

$$m dx^2/dt^2 + k_0 x = (p_2 - p_1) A, \quad (1)$$

where x is the deflection of the mass m with x=0 at the cylinder mid-stroke position, $k_0$ is the spring stiffness of the structure, A is the piston area, $p_1$, and $P_2$ are the pressures in chamber 16 and 18 respectively with friction being neglected.

In order to determine the effective stiffness of actuator 10, consider the compressibility of the fluid in cylinder 14. The hydraulic compressibility is characterized by beta=$-V\{dp/dv\}$, where beta is the fluid bulk modulus, and V is the volume of chamber 18 or 16. Application of this relation to both sides of the cylinder 14 leads to the following equations:

$$dp_1/dt = \text{beta}/V_1(-dV_1/dt + q_1) \quad (2)$$

$$dp_2/dt = \text{beta}/V_2(-dV_2/dt + q_2), \quad (3)$$

where $q_1$, $q_2$ is the flow rate of fluid flowing into chambers 16 and 18 respectively, $V_1 = V_{10} + (s/2-x) A$ is the total volume in chamber 16, and $V_2 = V_{20} + (s/2+x) A$ is the total volume in chamber 18, with s being the length of the cylinder stroke and $V_{10}$, $V_{20}$ the volumes of fluid in the lines and fittings connected with chambers 16 and 18, respectively.

While the valve is closed, $q_1 = q_2 = 0$ and the pressure on either side of the cylinder 14 can be obtained by integrating equations 2 and 3. For small changes in x, the approximation dp=$-$beta dV/V can be used to give:

$$p_1 - p_{1o} = \{\text{beta}/V_{10} + s A/2\} A x \quad (4)$$

$$p_2 - p_{2o} = \{-\text{beta}/V_{20} + s A/2\} A x \quad (5)$$

Assume that $p_{1o} = p_{2o}$ and $V_{10}$ approximately equals 0 and $V_{20}$ approximately equals 0, or, the volume of fluid in the lines is small compared to the cylinder 14 volume sA. Using these assumptions, and combining equations 4 and 5 with 1 gives:

$$m dx^2/dt^2 + k_0 x = -\{4A \text{ beta}/s\} x.$$

Thus, the effective spring constant of actuator 10 with valve 22 closed is $k_1 = \{4 A \text{ beta}/s\}$. Typical hydraulic fluids have a bulk modulus of about beta=250,000 psi, so for example, an actuator with a piston area of 1 inch$^2$ and a stroke of 4 inches would have a stiffness $k_1$=250,000 lb/inch! Note that this stiffness could easily be reduced by decreasing the effective area and increasing the stroke. In the small test structure described below air was used instead of hydraulic fluid since the forces generated on the structure would be too large otherwise. Using pV=nRT, the effective bulk modulus of air is beta=$-V\{dp/dv\}$=p=14.7 psi, when the actuator is assembled at atmospheric pressure.

Now consider what happens if the piston is displaced to some position x>0 with dx/dt=0, and the valve is suddenly opened. In this case, the flow rate of fluid from chamber 16 to 18 is given by:

$$q_2 = -q_1 = c \{p_1 - p_2\}^{1/2}, \quad (7)$$

where c is a constant that is dependent on the valve orifice area. For the following control law, the time it takes for the net force on the piston to reach zero is of interest. Using equations 7, 2, and 3 with $V_1 = V_2 = V_{ms}$, dx/dt=0, and the fact that the net force to the right is $F=(p_2-p_1) A$, we have:

$$dF/dt = (dp_2/dt - dp_1/dt)A \quad (8)$$
$$= \{2 \text{beta}/V_{ms}(-Adx/dt + c\{p_1 - p_2\}^{1/2})$$
$$= \{2 \text{beta} c/V_{ms} A^{0.5}\}\{-F^{0.5}\},$$

where we note that since we assumed x>0 to start with, F<0 so the term under the square root is actually positive. Integrating equation 8 we obtain:

$$F(t) = -([-F(0)]^{0.5} - \{\text{beta } c/V_{ms}\{A\}^{0.5}\} t)^2. \quad (9)$$

Hence, the time it takes for F(t) to reach zero is finite, and is given by:

$$t_o = \{V_{ms} A^{0.5}\}/\text{beta } c \}\{-F(0)\}^{0.5}. \quad (10)$$

The main point to note from equation 10 is that because of the beta term in the denominator, $t_o$ is very small.

The Control Law

The control law is motivated by two properties derived in the last section:

1. The effective spring constant $k_1$ of the truss element or actuator 10 can easily be sized to match the requirements of any structure.
2. If the actuator valve is opened, the fluid quickly reaches equilibrium with the net actuator force F=0.

Thus, if the valve is pulsed from closed to open for a short time and then closed again, we have effectively reset the unstretched length of the truss element. This means that any energy stored in the truss element at the time of the pulse, or reset, is lost to heat. This provides an ideal means of extracting energy from the vibrating system.

The following development shows that the control law for the one degree of freedom system is to wait until the energy in the truss element is maximized and then reset its zero position at this point by pulsing the valve from closed to open to closed. This extracts all energy stored in the actuator at this point. The other spring $k_0$ then pulls the system into motion, and the actuator is again reset when its energy is maximized. Because it is a simple matter to sense the net actuator force with a differential pressure transducer, the controller needs only to monitor this pressure signal and pulse the valve when the signal peaks. The peaks in the differential pressure signal occur when the energy in the truss element are maximized.

The Control Law for General Structures

We now develop the control law for general, undamped, n-degree-of-freedom structural systems with 1 resettable actuators 10. The dynamic equations of motion are:

$$M d x^2/dt^2 + K_0 x + \sum_{i=1}^{l} K_i(x - x_{s,i}) = 0 \quad (11)$$

where x(t) is an n-tuple R{n} or the state vector denoting the n generalized coordinates and M, $K_0$ are from the space $R^{(n \times n)}$ are positive definite matrices; $x_{s,i}(t)$ is the piecewise continuous vector denoting the zero force position of the $i^{th}$ actuator. As discussed previously, the resetting of the actuator makes $x_{s,i}$ equal to $x(t_n)$ at the nth resetting. For example, when the $i^{th}$ actuator is reset, then $x_{s,i}=x(t)$ while the rest of the $x_{s,j}$, where j not equal to i, remain the same. The matrix $K_i$ is greater or equal to 0 and is the stiffness matrix corresponding to the stiffness of the $i^{th}$ actuator. Since the system has the form of variable structure discussed in the Fillipov theorem, the state vector x(t) and dx(t)/dt of this system are continuous.

Let E(t) be the total energy of this system, then $$E(t) = 1/2 \left[ x^T(t) K_0 x(t) + dx^T/dt(t) M dx(t)/dt + \sum_{i=1}^{l} (x(t) - x_{s,i}(t))^T K_i (x(t) - x_{s,i}(t)) \right]. \quad (12)$$

We have the energy of the system E>0 for all x(t) not equal to 0 or dx(t)/dt not equal to 0, since the $K_0$ and M are positive matrices and $K_i$ is positive semidefinite for i=1 . . . l. In addition, each term in the summation is greater or equal to zero. Without any actuator resetting, the energy of the system remains constant because there is no damping in our model system. If at some time t* the $i^{th}$ actuator is reset, then $x_{s,i}(t^*) = x(t^*)$. The energy of the system E(t*) is reduced by an amount of $E_i(t^*)$. Where, $$E_i(t^*) = \frac{1}{2}[(x(t^*)-x_{s,i}(t^*))^T K_i(x(t^*)-x_{s,i}(t^*))] >= 0 \quad (13)$$

Thus, every time the $i^{th}$ actuator is reset the energy of the system is reduced by an amount of $E_i(t)$ which is the amount of energy stored in the $i^{th}$ actuator at that time. However, the resetting process should not be done at arbitrary times. For instance, if the actuator were continuously reset, the reduction of the system energy would be very small because the energy stored in the actuator is almost zero, since $x(t)-x_{s,i}(t)$ is approximately equal to 0. This motivates us to design a logic to reset the $i^{th}$ actuator when the $E_i(t)$ is at its maximum value, which means $dE_i/dt=0$ The condition used to determine when to reset the actuators requires measurement of the nodal coordinates directly connected to the actuators, as well as their derivatives. However, because we have a truss element with only one degree of freedom, the reset condition reduces to:

$$dE_i/dt = dl_i/dt \ k_i(l_i - l_{s,i}) = df_i/dt(l_i - l_{s,i}) = 0,$$

where $k_i$ is the effective spring constant of the actuator, $l_i$ is the elongation of the actuator, $l_{s,i}$ is the zero force position of the actuator, and $f_i = k_i(l_i - l_{s,i})$. Thus, using this approach, either a position sensor or a force sensor (such as a pressure transducer) can be used with peak detection to determine when $df_i/dt=0$ or when $dl_i=0$. Also note that the number of sensors needed is the same as the number of actuators, and the control resetting process is completely decentralized.

The One Degree of Freedom System

Let us consider the simple case of the system in FIG. 1. The dynamic equation of this system is:

$$m d^2 x(t)/dt^2 + k_0 x(t) + k_1(x(t)-x_s(t)) = 0. \quad (14)$$

The resetting logic of this system reduces to:

when $x_s(t) \neq x(t)$ then set $x_s(t) = x(t)$ whenever $dx(t)/dt=0$ or $df/dt = k_1 dx/dt = 0$. (15)

Due to its simplicity, the solution for this case can be solved analytically. Let the initial $x_s$ be set to zero and time $t_1$ be the first time the actuator is reset, i.e., $x_s(t_1)=x(t_1)$ and $dx(t_1)/dt=0$. The motion for this system can be expressed as:

$$x(t) = a_0 \cos(w_n(t-t_0) + \phi) \text{ for } t_0 \leq t < t_1 \quad (16)$$

where $a_0$ depends on the initial conditions, $w_n = \{(k_0+k_1)/m\}^{0.5}$, and $\phi$ is a constant that makes $dx(t_1)/dt=0$ and $x(t_1)=a_0$. From $t_1$ until the next reset time $t_2$, the system becomes:

$$m d^2 x(t)/dt^2 + (k_0+k_1)x(t) = k_1 x_s(t_1) \quad (17)$$

where, $x_s(t_1) = x(t_1) = a_0$. Taking the appropriate initial conditions into account, $$x(t) = a_0/(k_0+k_1) [k_0 \cos(w_n(t-t_1)) + k_1]$$

After a half cycle, i.e., $(t_2 - t_1) = \pi/w_n$, we have $dx(t_2)/dt=0$ and another actuator resetting. Thus $$x(t_2) = -a_0(k_0 - k_1)/(k_0+k_1). \quad (18)$$

This process can be continued forward in time. In general, after resetting the actuator n-1 times the motion and the initial conditions for the next resetting time $t_n$ can be expressed as:

$$x(t) = (-1)^{n-1} a_0 (k_0-k_1)^{n-2}/(k_0+k_1)^{n-1} [k_0 \cos(w_n*(t-t_{n-1})) + k_1] \text{ for } t_{n-1} \leq t < t_n$$

$$x(t_n) = (-1)^{n-1} a_0 [\{k_0-k_1\}/\{k_0+k_1\}]^{n-1}$$

Figure 2A:
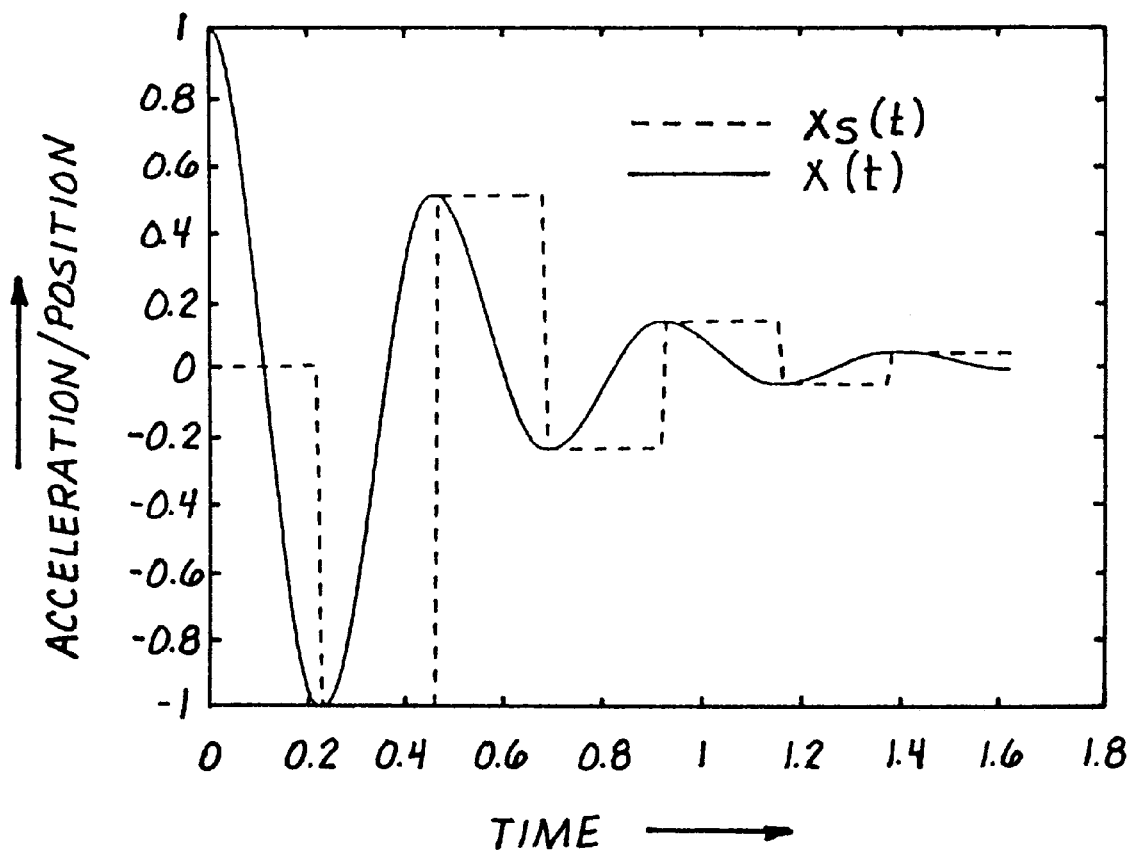
FIGS. 2a and 2b are graphs of the displacement of the piston, actuator unstretched position and energy as a function of time in a structure having one degree of freedom controlled according to the invention.
Figure 2B:
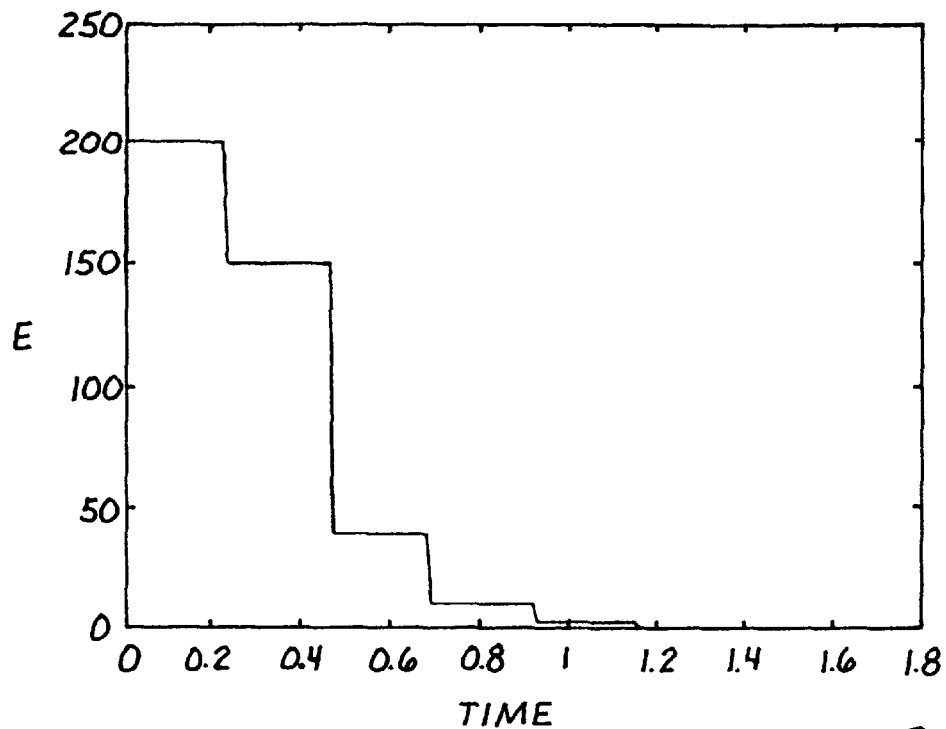

Since $q = (k_0-k_1)/(k_0+k_1) < 1$, as n goes to infinity we have $x(t_n)$ going to 0. Therefore the amplitude of the system decays exponentially with each half cycle. Note that the rate of decay depends on the fraction q. As $k_1$, the spring constant of the actuator increases from zero to $k_0$ the value of q decreases from 1 to zero, therefore the rate of decay increases. At the critical value of $k_1 = k_0$, q=0, and the system reaches the desired equilibrium state one half cycle after the first piston is reset with $t = t_1 + \pi/w_n$! An example ideal response of a one degree of freedom system with m=1, $k_0 = 150$, and $k_1 = 50$ is shown in FIGS. 2a and b. The value of $x_s(t)$, the actuator unstretched position, is shown a dotted line in FIG. 2a which is a graph of acceleration as a function of time in seconds along with x(t) shown in solid line. FIG. 2b is a graph of the total energy E(t) in the system as a function of time.

Experimental Results

An experimental model three story building was fabricated and the active truss element 10 located as a diagonal member between the bottom and second floors to react to shear loading. The actuator fluid in this case was air, so the nominal stiffness of the truss element is only about 25 lb/in. The top two floors were instrumented with accelerometers. A motor with an unbalanced load was bolted to the top floor to test the response of the system to persistent periodic inputs at different frequencies. The structure was five feet high, constructed of thin steel strap side elements screwed into aluminum plate floors.

Figure 3:
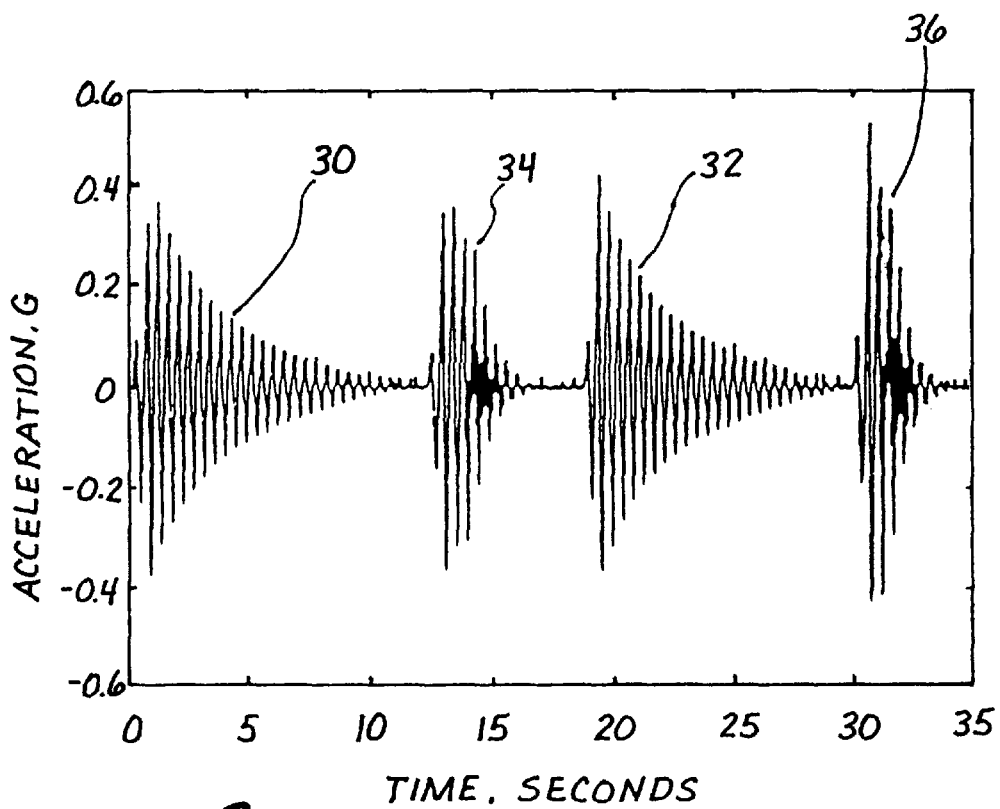
FIG. 3 is a graph of third floor acceleration as a function of time of a model of a three story building subject to a single large displacement and alternately controlled and uncontrolled by the method of the invention.

The free response of the structure is shown in FIG. 3 where the acceleration of the top floor is shown as a function of time. The structure was manually excited and then released four times. The first and third signal portions 30 and 32 are the case when the actuator valve is kept closed so that no control occurs. The second and fourth signal portions 34 and 36 are the responses when the proposed actuator resetting control law is used. The settling time for the controlled case is less than one half that of the uncontrolled case.

Figure 4:
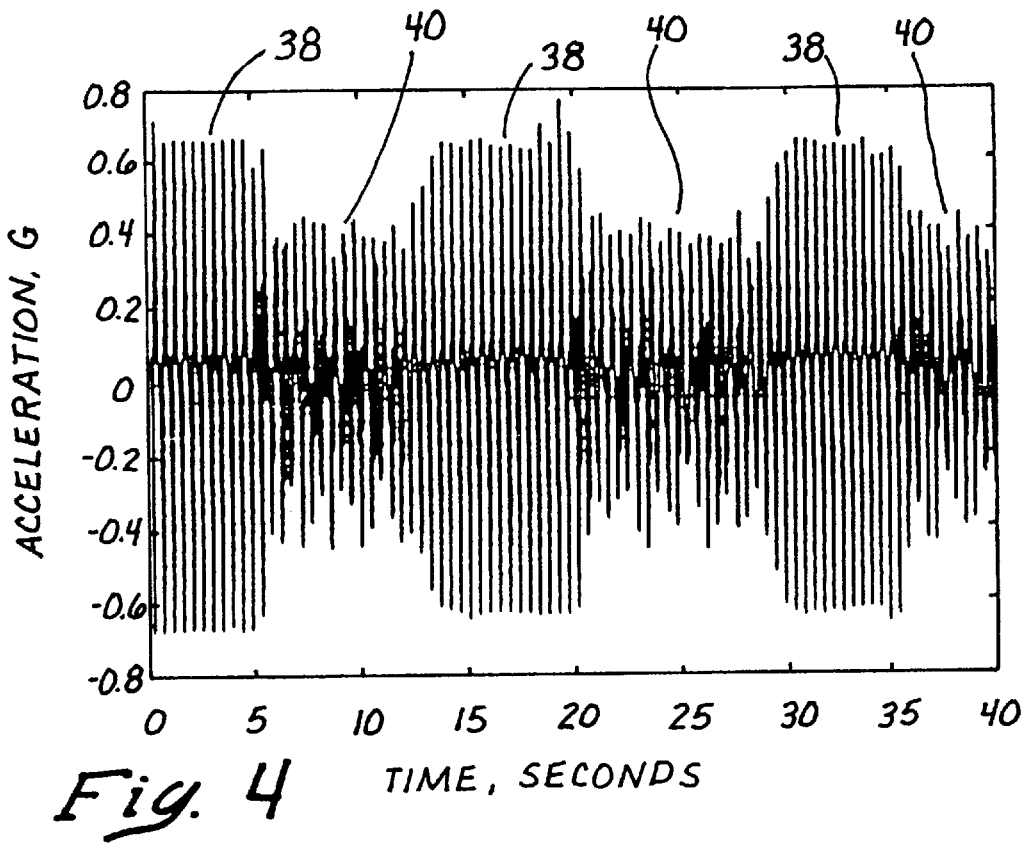
FIG. 4 is a graph of third floor acceleration as a function of time of the model of FIG. 3 subject to periodic displacements near a first resonant frequency of the building model and alternately controlled and uncontrolled by the method of the invention.
Figure 5:
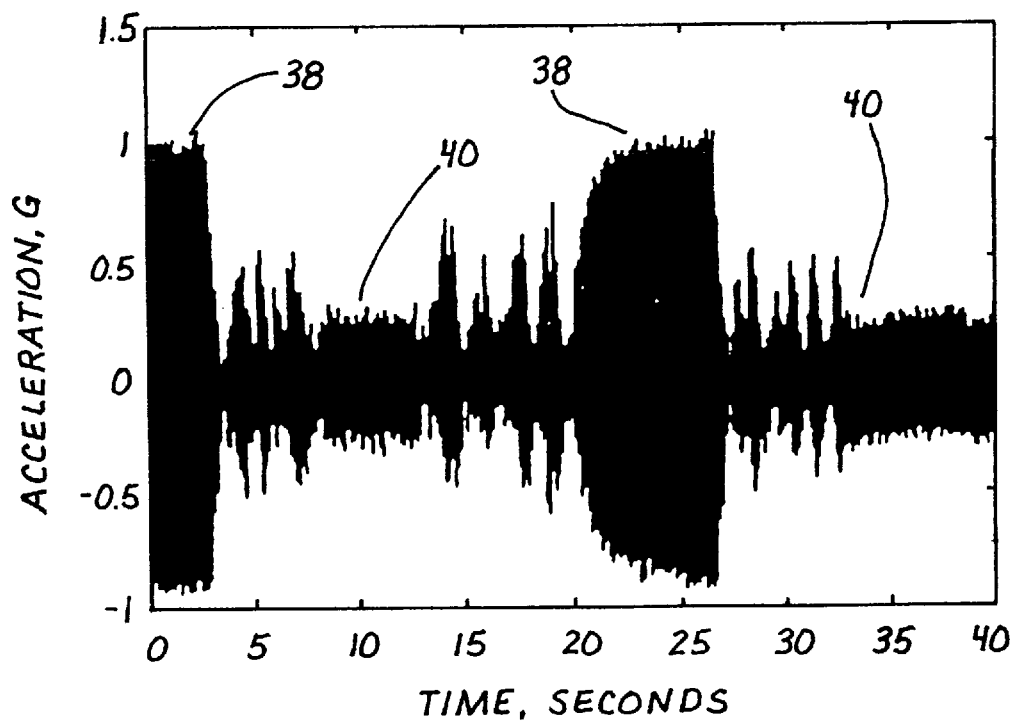
FIG. 5 is a graph of third floor acceleration as a function of time of the model of FIGS. 3 and 4 subject to periodic displacements near a second higher resonant frequency of the building model and alternately controlled and uncontrolled by the method of the invention.

The forced response of the structure to a periodic forcing function caused by an unbalanced rotating load on the top floor is shown in FIGS. 4 and 5. FIG. 4 is a graph of aceleration verses time with an excitation near a first resonant frequency for the structure while FIG. 5 is a graph of aceleration verses time with an excitation near a second resonant frequency for the structure. The large amplitude portions 38 of the graphs in FIGS. 4 and 5 occur when no control is applied, and actuator valve 22 is closed. The smaller amplitude portions 40 of the plots of FIGS. 4 and 5 occur when the actuator resetting control law described above is used. There is a reduction of the peak acceleration by about one half. Note that no attempt was made to optimize the size of the actuator in relation to the structure in this model. If the actuator stiffness were increased to value close to the effective structural stiffness at the first floor, the above analytical results for the one degree of freedom case suggest better performance could be obtained.

Therefore, it may now be appreciated that a method for suppressing vibrations in flexible structures has been developed that uses a reliable, decentralized, and inexpensive actuator and control technique. The method extracts the strain energy from the structure in an active truss element that dissipates this energy as heat. This is accomplished by resetting the element's unstretched length at times when its energy is maximized. Analytical and experimental results indicate the effectiveness of the technique, and provide some guidance on design considerations. It is shown that almost any effective spring constant for the truss element can be obtained, from a few pounds per inch to hundreds of tons per inch.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

For example, although the illustrated embodiment has been described in the context of seismic protection of buildings or earth bound structures, the invention is applicable to any system where vibrations need to be controlled, including machinery, terrestrial and aerospace vehicles and structures. For example, large orbital structures such as antennas and solar collectors which are undamped in outer space by air can use the damping control of the invention to advantage.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself. For example, although electronic control through pressure transducers has been described, it is expressly contemplated as being within the scope of the invention that the electronic control could be replaced with a fluidic control system which would provide the truss element with more robustness.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of controlling a resettable truss element for maximizing the absorption of energy in a structure comprising:

determining when a predetermined amount of energy is stored in said resettable truss element by movement of said structure; and resetting said truss element to substantially relax said truss element and absorb said predetermined energy therein, whereby energy vibration in said structure is optimally absorbed in said truss element.

2. The method of claim 1 where determining when said predetermined energy is stored in said truss element comprises determining when a maximum amount of energy is stored in said truss element.

3. The method of claim 2 wherein said truss element is a double acting hydraulic cylinder with a first and second chamber, and where determining said energy stored in said truss element comprises measuring the difference in pressure between said first and second chamber within said double acting hydraulic cylinder and determining when said pressure differential between said first and second chamber is maximum or minimum.

4. The method of claim 3 where resetting said truss element comprises equalizing pressure in said first and second chamber.

5. The method of claim 4 wherein equalizing pressure in said first and second chamber is performed within a time period substantially less than most periods of motion of said structure.

6. The method of claim 3 wherein said first and second chamber are coupled through a valve-controlled conduit, said valve being closed at all times until a maximum or minimum pressure differential is detected at which time said valve opens equalizing pressure between said first and second chamber and converts energy stored in said truss element into heat, said valve closing after said pressure has been equalized.

7. The method of claim 1 wherein a plurality of resettable truss elements are provided coupled to said structure and where determining when said predetermined energy stored in said truss elements by virtue of movement of said structure has reached said predetermined energy is separately determined with respect to each one of said plurality of truss elements and resetting said plurality of truss elements is separately performed with respect to the resetting of each one of said plurality of truss elements.

8. The method of claim 1 further comprising sizing said truss element to provide a predetermined stiffness of an effective spring constant associated with said truss element with respect to said structure, said predetermined stiffness matching structural requirements of said structure.

9. The method of claim 8 where sizing said truss element is performed for each one of a plurality of truss elements.

10. The method of claim 9 wherein said plurality of truss elements are coupled to said structure in a plurality of locations and wherein each of said truss elements is sized according to requirements for stiffness at said corresponding location of said truss element.

11. The method of claim 1 where determining said predetermined energy is determined when force, applied to said truss element by said structure, has reached a predetermined magnitude and resetting said truss element zeroes out said force applied between said truss element and structure.

12. The method of claim 11 where said predetermined magnitude of force is a maximal force in tension or compression.

13. The method of claim 1 where resetting said truss element comprises resetting said truss element whenever the first derivative of energy in said truss element is zero, namely dE/dt=0, and E>0 where E is the energy stored in said truss element and t is time.

14. The method of claim 13 wherein a plurality of truss elements are provided, each coupled to said structure, and wherein each said truss element is reset when the first derivative of the energy of each truss element considered as a separate system zero.

15. An apparatus for absorbing energy in a structure comprising:

a resettable truss element coupled to said structure;

a sensor coupled to said resettable truss element for determining energy stored in said truss element;

a control circuit coupled to said sensor and resettable truss element, said control circuit being responsive to said sensor to reset energy stored in said truss element to zero when a predetermined energy parameter is detected by said control circuit, whereby energy absorption within said structure is improved.

16. The apparatus of claim 15 wherein said resettable truss element is a double acting hydraulic cylinder having a first and second chamber and said sensor is a pair of pressure transducers, one of which is disposed in said first chamber and the other one of which is disposed in said second chamber of said hydraulic cylinder.

17. The apparatus of claim 16 where said control circuit resets said truss element when energy transferred to said truss element from said structure is maximal and wherein said maximal energy is determined when said pair of pressure transducers indicates a maximal pressure difference between said first and second chamber in said hydraulic cylinder.

18. The apparatus of claim 15 where said control circuit resets said truss element when energy transferred to said truss element from said structure is maximal.

19. The apparatus of claim 18 said control circuit resets said truss element when energy transferred to said truss element from said structure is maximal and wherein said maximal energy is detected when the first derivative of said energy is zero, namely dE/dt=0 where E is the energy stored in said truss element and t is time.

20. The apparatus of claim 15 wherein said resettable truss element is sized and has a spring constant stiffness matching structural requirements of said structure.

* * * * *